United States Patent
Mayer et al.

(10) Patent No.: US 7,039,557 B2
(45) Date of Patent: May 2, 2006

(54) DEVICE AND METHOD FOR THE EARLY RECOGNITION AND PREDICTION OF UNIT DAMAGE

(75) Inventors: Christian-Michael Mayer, Jakarta (ID); Andreas Schwarzhaupt, Oberrot (DE); Gernot Spiegelberg, Heimsheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/488,860

(22) PCT Filed: Jul. 3, 2002

(86) PCT No.: PCT/EP02/07362

§ 371 (c)(1),
(2), (4) Date: Oct. 25, 2004

(87) PCT Pub. No.: WO03/023721

PCT Pub. Date: Mar. 20, 2003

(65) Prior Publication Data

US 2005/0049835 A1    Mar. 3, 2005

(30) Foreign Application Priority Data

Sep. 7, 2001    (DE) ............................. 101 44 076

(51) Int. Cl.
*G06F 19/00* (2006.01)
(52) U.S. Cl. .......................... 702/184; 714/30
(58) Field of Classification Search ........ 702/182–185, 702/58, 188–189, 145; 714/25, 30, 39, 42, 714/47
See application file for complete search history.

(56) References Cited

U.S. PATENT DOCUMENTS 4,545,250 A    10/1985    Miwa
(Continued)

FOREIGN PATENT DOCUMENTS

DE    31 10 774 A1    3/1981
(Continued)

OTHER PUBLICATIONS

DD 214 709 A (Energiewerke Nord GmbH)l; Oct. 17, 1984.
(Continued)

*Primary Examiner*—Edward Raymond
(74) *Attorney, Agent, or Firm*—Crowell & Moring LLP (57) ABSTRACT

In a method and apparatus for early detection and prediction of damage to assemblies in machine plants, including mobile machine plants, structure-borne sound of the machine system is sensed by a sensor, output as an acceleration signal and analyzed in a digital signal processor. For this purpose, the acceleration signal is first transformed into the frequency domain by means of a fast-Fourier transformation, and the data obtained in this manner are then transformed back into the time domain by means of cepstrum analysis, so that resonance data relating to individual shock pulses (a cepstrum) is obtained in the time domain. This cepstrum is then compared with a reference cepstrum that is selected in accordance with load signals and rotational speed signals for the present operating state in a new machine plant in a storage device. When limiting values are exceeded, the diagnostic signal (in particular information relating to the assembly which is diagnosed as damaged and its predicted remaining service life) are displayed for the user and an emergency operating mode is initiated.

18 Claims, 4 Drawing Sheets

U.S. PATENT DOCUMENTS

| | | | |
|---|---|---|---|
| 5,629,864 A | 5/1997 | Noe et al. | |
| 5,675,506 A | 10/1997 | Savic | |
| 5,689,429 A | 11/1997 | Depiante | |
| 5,996,910 A | 12/1999 | Takeda et al. | |
| 6,066,098 A | 5/2000 | Masotti et al. | |
| 2004/0236450 A1 * | 11/2004 | Bryant et el. | 700/108 |

FOREIGN PATENT DOCUMENTS

| | | |
|---|---|---|
| DE | 43 06 270 C1 | 3/1993 |
| DE | 42 17 067 A | 11/1993 |
| DE | 195 45 008 C2 | 12/1995 |
| EP | 0 489 261 A2 | 6/1992 |
| EP | 0 413 845 B1 | 4/1993 |
| EP | 0 601 365 B1 | 6/1994 |
| EP | 0 637 012 A2 | 2/1995 |
| EP | 0 764 244 B1 | 3/1997 |
| EP | 1 101 971 A1 | 5/2001 |
| JP | 08114638 A | 5/1996 |
| JP | 09079997 A | 3/1997 |
| JP | 09210970 A | 8/1997 |
| JP | 11311618 A | 11/1999 |
| JP | 2001-099757 A | 4/2001 |
| WO | WO 99/24699 | 5/1999 |

OTHER PUBLICATIONS

Randall R.B., et al: "Cepstrum, Analysis" Technical Review, Burel OG Kjaer, Naerum, DK, No. 3, 1981, pp. 3-44 (XP000763132).

Database Inspec "Online!"; Institute of Electrical Engineers, Stevenage, GB; Ziye Li et al; "Failure diagnosis system by sound signal for automobile engine" Database accession No. 5722574 (XP002236125) and Proceedings of the Japan-USA Symposium on Flexible Automation—1996; Proceedings of 1996 Japan-USA Symposium on Flexible Automation, Boston, MA, USA, Jul. 7-10, 1996, pp. 427-432 vol. 1, 1996, New York, NY, USA, ASME, USA ISBN: 0-7918-1231-6.

R.B. Randall: "Cepstrum analysis and gearbox fault diagnosis" Maintenance Management International, 1982-1983, pp. 183-208, XP008015538, Manchester UK.

* cited by examiner

DEVICE AND METHOD FOR THE EARLY RECOGNITION AND PREDICTION OF UNIT DAMAGE

BACKGROUND OF THE INVENTION

This application claims the priority of German patent document 101 44 076.6, filed 7 Sep. 2001 (PCT International Application No. PCT/EP02/07362, filed 3 Jul. 2002), the disclosure of which is expressly incorporated by reference herein.

The invention relates to a method and apparatus for early detection and prediction of damage to assemblies in machine plants, especially mobile machine plants.

Numerous methods and devices are known in for determining the time at which a motor vehicle should be serviced.

For example, German patent document DE 3110774 A1 discloses a method for determining servicing intervals, in which the time for servicing is determined continuously as a function of wear states of the operating variables for which service is to be performed. In this respect, either a single reference variable (for example the lubricating capacity of the engine oil or the state of the brake lining) is used, or further wear states of other operating variables (for example the clutch, carburetor setting, spark plugs, ignition time etc.) are sensed and taken into account in the calculation of the time for a service. The extrapolated time for a service is signaled to the driver by means of a display.

German patent document DE 43 06 270 C1, on the other hand, discloses a method for determining and extending a replacement interval for an assembly by means of at least one operating value which is sensed directly or indirectly and represents the quality state of the operating material. A computing and control unit evaluates at least one operating value, and continuously calculates the replacement interval (and its ratio with respect to a predefined assembly servicing interval), taking into account further sensor data which represent operational values such as the number of starts, number of revolutions of the crankshaft, engine temperature, engine oil pressure, etc.

European patent document EP 0 489 261 A2 discloses a device for calculating a motor vehicle servicing interval based on various sensed and determined operational values such as the number of starts, the revolutions of the crankshaft, the driving times and stationary times, engine temperature, engine oil pressure, charge air pressure, oil consumption, fuel consumption and the like. The calculation result is output audibly and/or visually as a servicing display or instruction. An engine oil refilling process is sensed in terms of quantity and the servicing interval is subsequently extended once by a defined period or a defined odometer reading.

Finally, European patent document EP 0 601 365 B1 discloses a method and apparatus for determining the time for servicing a motor vehicle brake system. Here, the rotational speed and the velocity of the vehicle are determined for each wheel, and the wheel slip is calculated therefrom and stored. If a difference between the wheel slip for various wheels becomes greater than a predefined value, a brake problem signal is generated, and the servicing request is displayed in response to said signal.

In these conventional methods, sensed data obtained on at most one electronic monitoring side are evaluated and assigned to a functional failure, and the time for service is then determined correspondingly.

However, in these conventional methods, no predictive diagnostics are possible. Rather, a time for service is determined from sensor data by reference to faults that are already present; that is, faults which already exist. As a result, only one fault diagnostic operation takes place.

However, methods are also known in which a service interval is determined in a predictive and flexible way.

International patent document WO 99/24699, for example, discloses a method and apparatus for monitoring and/or determining engine oil quality. For this purpose, changes in the viscosity of the oil are determined and evaluated as a function of the temperature and engine friction torque. A control unit for processing and converting recorded data and at least one storage unit are provided for this purpose, and characteristic curves which are necessary for determining the viscosity are stored in one or more storage units. The replacement time for the engine oil is determined as a function of this viscosity data in such a way that the engine is not damaged by inadequate lubrication and cooling.

Furthermore, European patent document EP 1101971 A1 discloses a method for performing diagnostics based on the state of components which are subject to continuous wear, for example brake linings. Here, the wear state is sensed using sensors, and an alarm is issued if the value drops below a predetermined value.

European patent document EP 0764244 B1 discloses a brake-lining-wear measuring system in which wear is sensed by means of a displacement sensor. In this system it is sensed when a new unused brake lining is used, and a new reference value for wear measurements is then correspondingly generated. Subsequently, in response to the new reference value, a wear limit, which represents an acceptable minimum brake lining thickness determined by subtracting the known thickness of the new linings from the new reference value, is generated and stored. In this way, in determining the wear limit, the system takes into account the disk thickness or drum thickness, which decreases throughout the service life of the brake. The expected remaining distance is predicted based on the past wear profile and the remaining lining thickness, and output via a servicing diagnostic system.

However, these methods also permit only one prediction regarding the aging of the lubricant, and the wear of susceptible parts such as brake linings and clutch lining. Moreover, the state of the purely mechanical components of an assembly cannot be determined sufficiently by means of these conventional methods.

In contrast, methods for the early detection of damage are known, for example, in the field of power plant technology or for monitoring machinery in large plants. Out of the necessity to avoid unscheduled down times in large power plants due to the sudden failure of components, methods have been developed which permit the early detection of damage to assembly components, without the component's already exhibiting the conspicuous functional fault. Based on the results which are determined by these methods, it is then possible to decide whether a specific component must be replaced in the next planned machinery downtime for carrying out servicing, or can still continue in use.

German patent document DE 195 45 008 C2 discloses a method for monitoring periodically operating machines, for the early detection of changes. For this purpose, measuring signals which are specific to the machines are sensed by a monitoring sensor, and processed in an evaluation unit with a reference (i.e., measuring signals which are representative of a new machine). In particular, a frequency spectrum derived from the time signals supplied by the sensor is calculated by means of a Fourier transformation for the machine cycle, using frequency signals of at least two, (preferably at least ten), frequency spetra. Mean values of the individual frequency assignment, which form the basis for the monitoring method, are also calculated in the same manner. A sensed change may be indicative of to an irregularity in a fabrication process which results in a change in behavior in the machine, and/or damage to a machine. This change in the machine is displayed.

European patent document EP 0413845 B1 discloses a method for the early detection of damage to machine components, in particular on roller bearings. In this method, forced vibrations of a machine owing to damage to a roller bearing are sensed using a vibration pickup. A digitized signal is generated from this measured signal (for example, the measured acceleration), and decomposed into periodically determined signal components, periodically recurring components with stochastic amplitude, and generally stochastic components. Then, the signal components are analyzed as a function of frequency in order to determine characteristic variables relating to the stressing of the machine component. For this purpose, the frequency spectrum is preferably determined as a spectral power density. Damage-determining intensities for the specific frequency ranges are determined by means of frequency analyses, with the magnitude, scope and form of the frequency distribution being determined. Linking the frequency range and frequency distribution results in a stress factor for the roller bearing. The stress characteristic variables which are determined are compared with characteristic variables for tolerable stress of the machine component to determine the type of damage and/or to determine a degree of damage.

However, hitherto no device or method has been known for early detection and prediction of failures for nonfixed (i.e., mobile) assemblies. In particular, the conventional devices and methods which are explained above are not designed for use in assemblies which are subject to dynamic stress profiles and are operated in a mobile fashion.

SUMMARY OF THE INVENTION

One object of the present invention is to provide a method and apparatus for the early detection and prediction of damage to assemblies which can also be applied to mobile assemblies, which are subject to dynamic stress profiles.

This and other objects and advantages are achieved by the method and apparatus according to the invention, in which structure-borne sound of the machine system is sensed by a sensor, output as an acceleration signal and analyzed in a digital signal processor. For this purpose, the acceleration signal is first transformed into the frequency domain by means of a fast-Fourier transformation, and the data obtained in this manner are then transformed back into the time domain by means of cepstrum analysis, so that resonance data relating to individual shock pulses (a cepstrum) is obtained in the time domain. This cepstrum is then compared with a reference cepstrum that is selected in accordance with load signals and rotational speed signals for the present operating state in a new machine plant in a storage device. When limiting values are exceeded, the diagnostic signal (in particular information relating to the assembly which is diagnosed as damaged and its predicted remaining service life) are displayed for the user and an emergency operating mode is initiated.

Other objects, advantages and novel features of the present invention will become apparent from the following detailed description of the invention when considered in conjunction with the accompanying drawings.

DETAILED DESCRIPTION OF THE INVENTION

Figure 1:
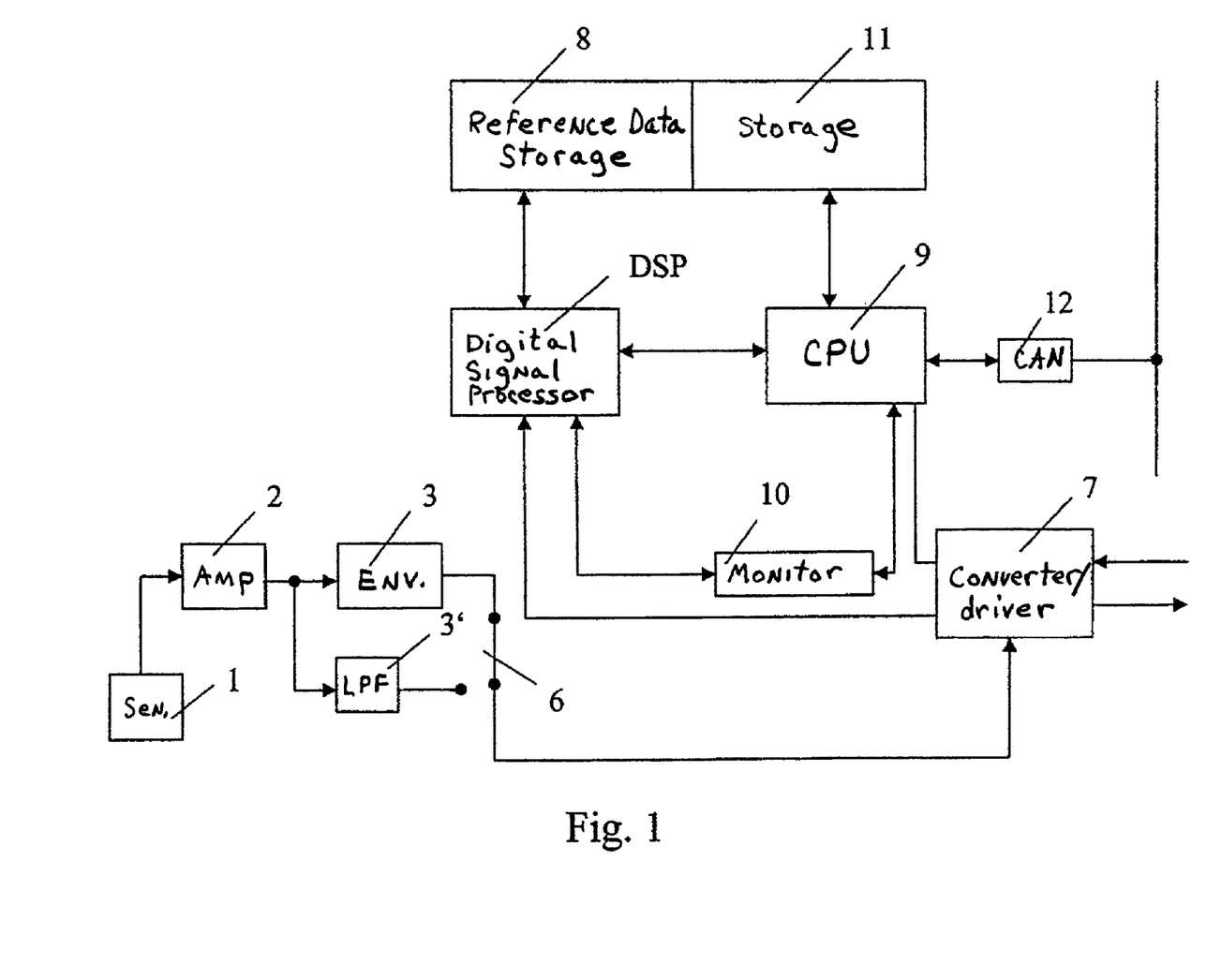
FIG. 1 is a block diagram of a device according to the invention for the early detection and prediction of damage to machinery.

A device for the early detection and prediction of damage to assemblies, which can be used in a mobile machine plant (for example, a drive train), will now be described with reference to FIG. 1. Damage to the drive train or drive train components (for example, the steering system, engine, gearbox, crankshaft, brake system, retarder, etc.) can de detected.

In the device according to the invention, a sensor 1, such as an acceleration pickup for sensing structure-borne sound in a machine plant, is arranged on the machine plant to be monitored, and is connected at its output to an amplifier device 2. The output of the amplifier device 2 is in turn connected both to an envelope curve forming device 3, and to a low-pass filter device 3'. The output of the envelope curve forming device 3 is connected to a first switched position of a switching device 6, while the output of the low-pass filter device 3' is connected to a second switched position of the switching device. The output of the switching device 6 is supplied to an input of a converter and driver device 7 which comprises, inter alia, an I/O (input/output) management A/D (analog/digital) converter and driver stages for an assembly controller. Further inputs of the converter and driver device 7 are connected to assembly sensors and actuators (not shown) of the machine plant.

An output of the converter and driver device 7 is connected to a digital signal processor DSP for feeding a sensor signal which is digitized by I/O management A/D converter of the converter and driver device 7. The digital signal processor DSP includes both a fast-Fourier transformation (FFT) device and a cepstrum analysis device, for generating resonance data of individual shock pulses in the time domain. For this purpose, the cepstrum analysis device comprises a logarithmic device for generating logarithmic expression of individual data and an inverse fast-Fourier transformation (IFFT) device.

One terminal of the digital signal processor DSP is connected to a storage device 8, which comprises, for example, an EEPROM and can be integrated into a storage device 11 for an assembly controller. The storage device 8 contains reference data, including a reference cepstrum and information that identifies which increases in amplitude in the cepstrum indicate damage to which assembly or assembly component. At a further input, the digital signal processor DSP is connected to a central processor unit 9 or CPU of the assembly electronics in order to supply present rotational speed information and load information.

The digital signal processor DSP and the central processor unit 9 are both connected to a monitoring or watchdog device 10 for reading out data from the digital signal processor and/or the central processor unit 9 for assessing whether critical data are exceeded (i.e., whether signals occur which lie outside of a predetermined tolerance range) and for outputting an assessment result. Furthermore, a further output of the digital signal processor is formed with the central unit 9 for outputting diagnostic data (i.e., data relating to imminent damage to an assembly).

Figure 2A:
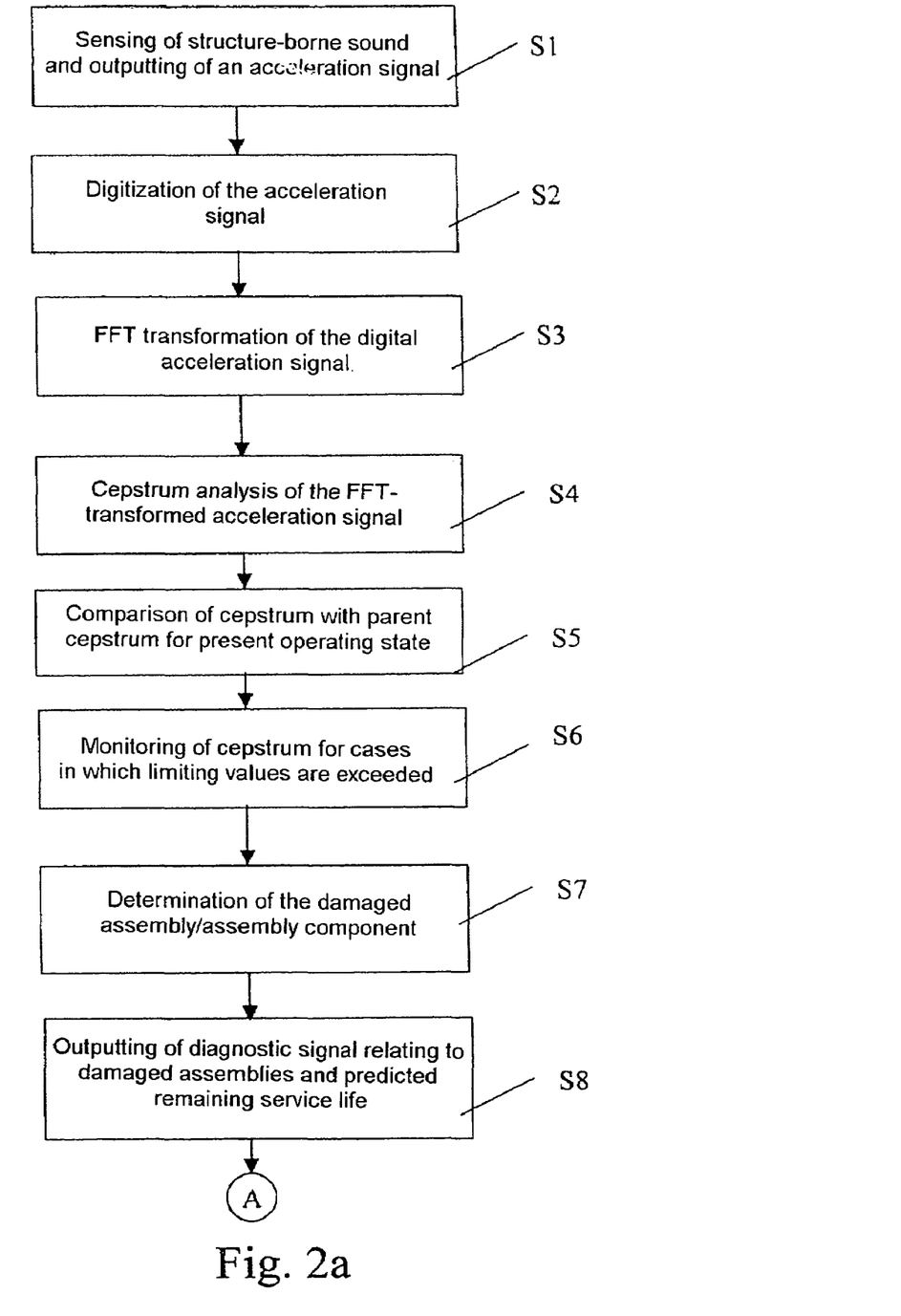
FIGS. 2a and 2b together form a flowchart for the method according to the invention.
Figure 2B:
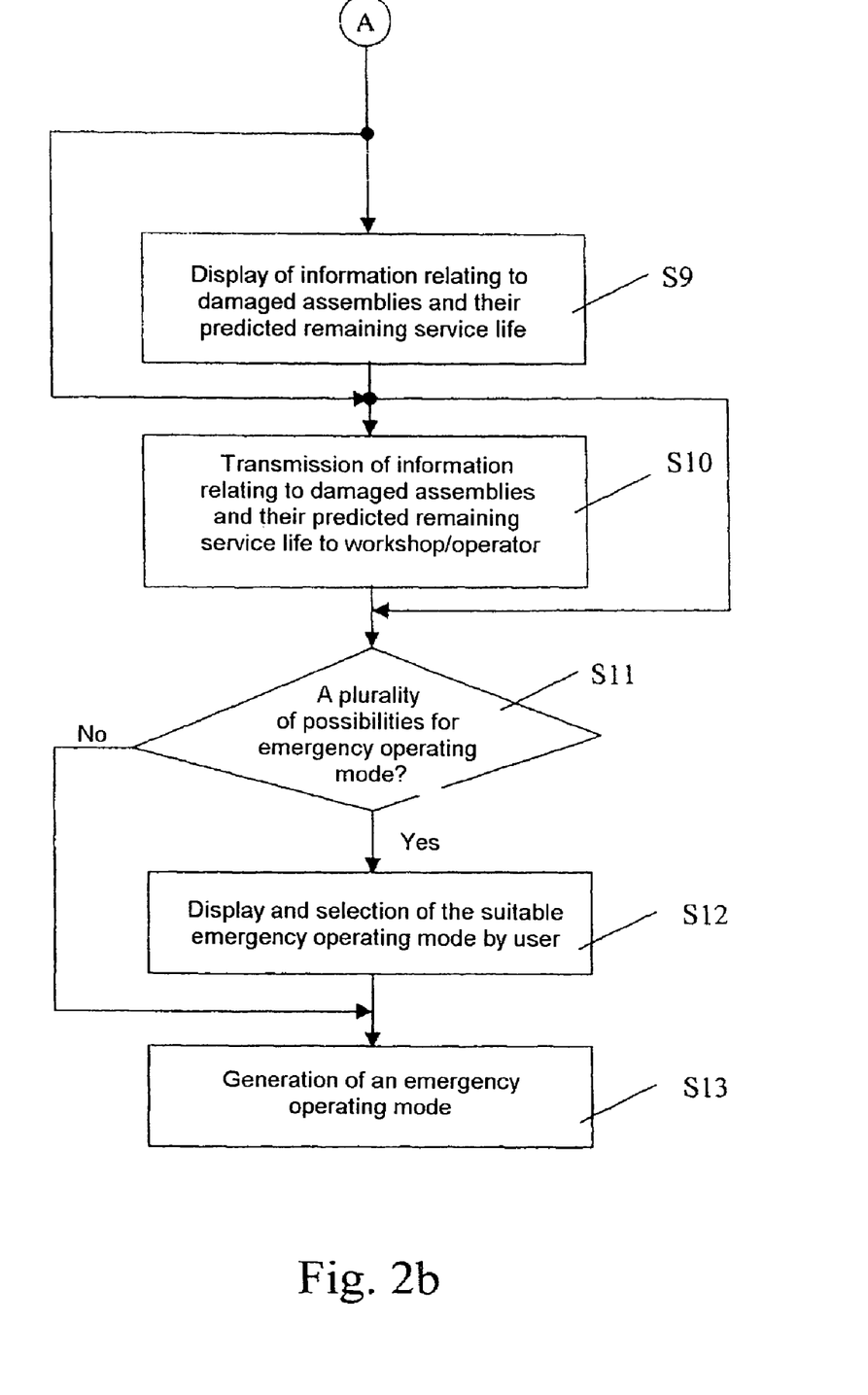

In what follows, the method for operation of a device described above for the early detection and prediction of damage to assemblies will be illustrated with reference to the flowchart shown in FIG. 2.

First, at least one sensor 1 senses the structure-borne sound of a machine plant which is to be monitored, and outputs a measuring signal (S1) (for example an acceleration signal). The measuring signal from the sensor device 1 is then fed to the amplification device 2 and amplified there, so that further processing can take place downstream, without difficulty. However, such amplification is applied to both the desired signal of the machine plant which is to be monitored, and noise signals that result, inter alia, from movement of a mobile machine plant. Noise signals include for example, vibration signals due to unevennesses in the floor, acceleration and braking etc. of a vehicle in the drive train. If evaluated directly, such amplified noise signals would have a direct adverse effect on the valuation results of the digital signal processor DSP.

For this reason, the amplified measuring signal which is output by the amplification device 2 is fed to an envelope curve forming device 3, which generates an envelope curve based on the measuring signal in order to smooth the radio-frequency measuring signal for the further processing. In the process, the envelope curve extends along the maximum amplitude values of the measuring signal. The output signal of the envelope curve forming device 3 is then fed to the converter and driver device 7.

Alternatively, in response to a signal from the digital signal processor DSP, the measuring signal can also be fed to a low-pass filter device 3' in which radio-frequency components of the sensor signal, (for example, undesired radio-frequency noise components) are filtered out. In contrast to the smoothed sensor signal which is generated by the envelope curve forming device 3, the low-pass-filtered measuring signal is a smoothed mean value of the radio-frequency measuring signal.

This low-pass-filtered output signal or smoothed measuring signal is then fed to the I/O management A/D converter of the converter and driver device 7. Rotational speed signals and load signals are sensed by assembly sensors (not shown) and fed to another input of the converter and driver device 7, to an analog/digital converter which is also formed in the converter and driver device 7, and converted (S2) therein into a digital signal.

The digital output signals of the analog/digital converter device of the converter and driver device 7 are then fed to the digital signal processor DSP. The digital signal processor DSP carries out a signal analysis in which features or events of the state of the machine are predicted by means of vibration bands. This can be carried out for all the machine components whose structure borne sound is transmitted as far as the sensor 1 via the machine structure.

The digital output signals of the analog/digital converter device of the converter and driver device 7, which are fed to the digital signal processor DSP, are firstly transformed (S3) into the frequency domain in a fast-Fourier-transformation device. This produces a data record which can be used to generate graphic analyses. Individual frequency lines and the form of expression of the harmonics may provide definite cause-specific information on assemblies under precisely defined measuring conditions. Frequency curves always continue increasing due to damage. However, due to the mobile use of the machine plant there are a plurality of interference frequency curves which complicate further evaluation.

Figure 3:
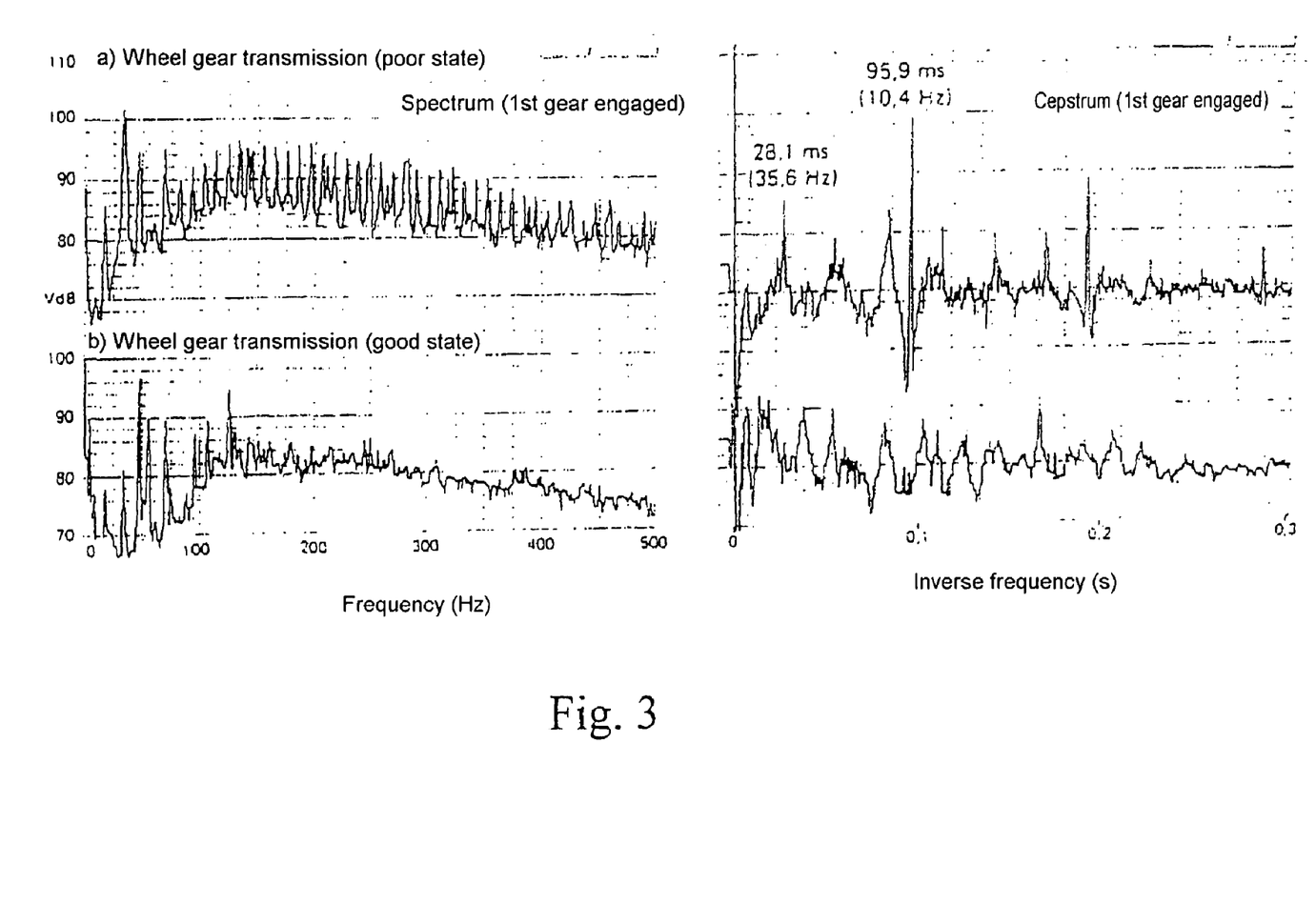
FIGS. 3a and 3b are graphic representations of the spectrum and cepstrum of a wheel transmission with the first gear speed engaged, without and with damage to the assembly.

For this reason, the cepstrum analysis device which is formed in the digital signal processor DSP carries out (S4) a rotational-speed-independent frequency analysis, which is indicative of the cause. For this purpose, the logarithmic device in the cepstrum analysis device calculates the logarithm of the individual data in the frequency domain after the fast-Fourier transformation has been carried out in the fast-Fourier transformation device. This logarithmic individual data is then transformed again by the inverse FFT (fast-Fourier transformation) device into the time domain, and is then available there as resonance data of the individual shock pulses on the inverse frequency axis (in the unit ms). FIGS. 3*a* and 3*b* are representations of the spectrum and cepstrum, respectively, of a wheel transmission with the first gear speed engaged, with damage to the assemblies (FIG. 3*a*), and without damage (FIG. 3*b*). On the left-hand side of FIGS. 3*a* and 3*b* the respective spectra which are determined are shown, while on the right-hand side the cepstrum is illustrated. It is apparent here that damage to the cepstrum, due for example, to individual shock pulses at 28.1 ms (35.6 Hz) and 95.9 ms (10.4 Hz) can easily be determined unambiguously. By means of the stored reference data, conclusions can then be drawn about the damaged assembly component from the position of the individual shock pulses.

The advantage of the cepstrum analysis is that repetitions occur in the spectrum, for example due to harmonic or side bands, or a curve occurs in the cepstrum if only one side band interval is present. For this reason, a very large number of curves in the spectrum, which have only a few causes, are reduced significantly. In particular, this is appropriate in the spectra of, for example, a defective roller bearing, geared teeth damage on transmissions, etc. as in these cases a very large number of spectral curves occur whose individual distances can no longer be easily detected and are costly to evaluate. The cepstrum analysis reduces the information to that which is essential.

The digital signal processor DSP accesses reference data (stored in the storage device 8) for the present operating state as a function of the rotational speed information and load information supplied by the central processor unit 9, and reads it out. It then compares the stored reference data (i.e., the reference cepstrum which was determined for an undamaged machine plant for various operating states) and the current cepstrum (S5). A watchdog device 10 which is connected to the digital signal processor DSP and the central processor unit 9 determines whether critical values are exceeded in the comparison result, (i.e., whether signals occur which lie outside a predetermined tolerance range in the present operating state), and if so, it outputs (S6) a corresponding signal to the digital signal processor DSP. However, at the time when it is detected that a tolerance range has been exceeded, it is usually not yet necessary to replace the affected component. Rather, a degree of incipient damage can already be detected.

The empirical values which are stored in the storage device 8 were obtained by determining cepstra over the entire service life of a machine plant, assigning changes in the cepstra to specific damage to an assembly or to an assembly component, and determining the remaining service life until a total failure occurs. Based on these empirical data, and based on the instances in which the tolerance range is exceeded in the cepstrum (and the degree to which it is exceeded), both the identity of a damaged assembly and its degree of damage (including the predicted remaining service life) are determined by the digital signal processor DSP.

In order to determine the predicted remaining service life, in addition to the known empirical values, the history of the machine plant to be monitored (for example extreme loading during only short service life, moderate loading over a long time period, and the like) are also taken into account, because the predicted remaining service life may then become shorter or longer. Subsequently, the digital signal processor DSP outputs a diagnostic signal to the central processor unit 9, which signal contains information as to which assemblies have what damage, and with which degree of damage (for example, an indication of the degree of damage of a specific gearwheel in the transmission), and when the latest change must take place in order to avoid a failure (S7).

The central processor unit 9 generates an emergency operating mode (S12) in response to the diagnostic signal (the diagnostic data), and messages are output (S8) on a display and operator control device (not shown). In particular, in response to the diagnostic data, a message is sent (S9) to the driver of the vehicle (S8) and/or by telemetry to the appropriate workshop and the haulage business. This message includes a driver-comprehensible indication of the detected or predicted fault, and a prediction of the time to failure or to a greater degree of damage to the corresponding assembly.

However, it may also be the case that there is no message issued, and there is also no possibility of selecting an emergency operating mode. These data are then stored only in a fault storage device (which may be provided, for example, in the storage device 11 for the assembly controller), to be read out during a subsequent customer service appointment.

The emergency operating mode, which is generated by the central processor unit 9 in response to the determined diagnostic information, is used to prevent or reduce further damage to the assembly which is diagnosed as damaged, while at the same time ensuring further availability of the vehicle. Such an emergency operating mode may provide, for example, that a respective gear is jumped over when there is damage to the transmission, or a reduction in the engine power/engine speed. For this purpose, emergency operating algorithms are stored, for example, in the storage device 11 for the assembly controller and are then correspondingly started by the central processor unit 9.

If various possibilities for emergency operation, with various effects (for example relatively long-term or short-term availability of the vehicle) are available (S10), they are indicated (S11) by the central processor unit 9 for selection on the display and operator control device (not shown). Depending on the situation, for example distance from the service shop or time period/distance for which the vehicle is still required, the driver can then select an emergency operating mode.

When a failure of the retarder is detected, for example, it is possible to switch it off, and actuate the brake system in such a way that it also assumes the function of the retarder. Conversely, when the brake fails, the function of the brake can also be assumed by the retarder by modified actuation. Furthermore, the conditioned diagnostic data of the drive train are made available via a drive train interface for further use/processing.

By communicating with devices of the machine plant which were already present (for example the central processor unit 9) and the associated use of machine-plant-specific communication structures 12 (for example of CAN or "car area network" modules in the case of a car), the complexity of the device is considerably reduced.

The method and apparatus according to the invention for the early detection and prediction of damage to assemblies increases the availability of machine plants by virtue of state-dependent servicing. Now, only components which have damage are replaced. Preventive replacement, with the risk of making something break down as a result of the repair, is avoided. Most repair times can be scheduled to occur in the normal down times.

As an alternative to the cepstrum analysis device, according to the invention a wavelet analysis device can also be used. For this purpose, a wavelet (i.e., a sinusoidal function with a superimposed Gaussian function) is superimposed on a signal to be compared, and a fast-Fourier transformation of these superimposed wavelet profiles is then carried out. Characteristic data, which permit good decomposition into individual components, and thus a direct assignment to a fault, can be obtained from this Fourier-transformed signal.

To summarize, the present invention discloses a method and apparatus for early detection or prediction of damage to components in machine plants, particularly mobile machine plants. For this purpose, structure borne sound of the machine plant is sensed by means of a sensor, output as an acceleration signal and analyzed in a digital signal processor. In order to eliminate the adverse effects of ambient conditions and structure borne sound waves that are not associated with the state of the machine plant, the acceleration signal is first transformed into the frequency domain by means of a fast-Fourier transformation, and the data obtained in this way are then transformed back into the time domain by means of cepstrum analysis so that resonance data of individual shock pulses (a cepstrum) are obtained in the time domain. This cepstrum is then compared with a reference cepstrum which is available in a storage device in accordance with load and rotational speed signals for the present operating state in a new machine plant. When limiting values are exceeded, the diagnostic signal, in particular information regarding damage to the assembly and its predicted remaining service life, are displayed for the user and an emergency operating mode is initiated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for early detection and prediction of damage to assemblies in a machine plant, comprising:
   at least one sensor which senses structure-borne sound in a machine plant that is being monitored, and which emits an analog measuring signal;
   an analog/digital converter device coupled to receive the analog measuring signal and convert it into a digital measuring signal;
   a digital signal processor, including a fast-Fourier transformation device for transforming the digital measuring signal into the frequency domain, and a cepstrum analysis device for generating a cepstrum containing resonance data relating to individual shock pulses in the time domain from the fast-Fourier-transformed digital measuring signal; and
   a storage device having stored therein a reference cepstrum that is representative of a new machine plant, for each of various operating states of the machine plant that is being monitored, together with an empirical value matrix relating to damaged assemblies and assembly components and anticipated remaining service lives; wherein, based on rotational speed information and load information the digital signal processor reads from the storage device a reference cepstrum that is representative of a new machine plant which is being operated in a current operating state of the storage device of the machine plant that is being monitored;

the digital signal processor compares said reference cepstrum that is read from the storage device with a present cepstrum that is generated in the digital signal processor, and outputs a comparison result;

a monitoring device monitors the comparison result of the present cepstrum and associated reference cepstrum to detect instances in which limiting values are exceeded, and forwards to the digital signal processor event information indicative of said instances in which said limiting values are exceeded; and in response to said event information provided by the monitoring device, and by referring to the empirical value matrix, the digital signal processor identifies a damaged assembly or assembly component, as well as its predicted remaining service life, and outputs to a central processor unit for further processing, a diagnostic signal, including information relating to damaged assemblies and their predicted remaining service life.

2. The device as claimed in claim 1, wherein, to determine the predicted remaining service life of a damaged assembly or assembly component, the digital signal processor also takes into account stored information regarding the history of the machine plant.

3. The device as claimed in claim 1, wherein the central processor unit displays the information contained in the diagnostic signal, relating to damaged assemblies and their predicted remaining service lives, on a display device or transmits said information by telemetry to a corresponding workshop or a machine plant operator.

4. The device as claimed in claim 1, wherein, in response to diagnostic signal for assemblies which are diagnosed as damaged, the central processor unit implements an emergency operating mode to prevent or reduce further damage to the damaged assembly and to ensure further availability of the machine plant.

5. The device as claimed in claim 4, wherein, if further possibilities for an emergency operating mode are present, the central processor unit displays such possibilities to a user for selection, so that the user can select an emergency operating mode in accordance with an alternative which suits him best.

6. The device as claimed in claim 1, wherein the machine plant is one of a drive train, a drive train component and a steering system.

7. The device as claimed in claim 6, wherein, when damage to the transmission is diagnosed in the emergency operating mode, a gear speed corresponding to such damage is jumped over, or the power or speed is reduced.

8. The device as claimed in claim 6, wherein, when a defect is diagnosed in a retarder as a drive train component in the emergency operating mode, the retarder is switched off, and a brake system assumes its function.

9. The device as claimed in claim 6, wherein, when a defect is diagnosed in a brake as a drive train component in the emergency operating mode, the function of the brake is taken over by a retarder.

10. The device as claimed in claim 1, wherein a wavelet analysis device is used to detect a damaged assembly.

11. A method for early detection and prediction of damage to assemblies in a machine plant, said method comprising:

sensing structure-borne sound from a machine plant that is being monitored, and issuing an analog measuring signal that is indicative thereof;

converting the analog measuring signal into a digital measuring signal;

transforming the digital measuring signal into the frequency domain, using a fast-Fourier transformation;

generating a present cepstrum containing resonance data relating to individual shock pulses in the time domain, by means of cepstrum analysis, based on a result of said fast-Fourier transformation;

based on rotational speed information and load information, a digital signal processor reading from a storage device a reference cepstrum that is representative of a new machine plant that is being operated in a current operating state of the machine plant that is being monitored;

the digital signal processor comparing said reference cepstrum that is read from the storage device with the present cepstrum, and outputting a comparison result;

monitoring said comparison result, to detect instances in which limiting values are exceeded; and providing to the digital signal processor event information indicative of said instances in which said limiting values are exceed;

based on said event information, and by reference to an empirical value matrix, determining a damaged assembly or assembly component, as well as its predicted remaining service life; and generating a diagnostic signaling that contains information relating to damaged assemblies and their predicted remaining service lives, and providing said diagnostic signal to a central processor unit for further processing.

12. The method as claimed in claim 11, stored information relating to history of the machine plant is also taken into account in determining the predicted remaining service life of a damaged assembly or assembly component.

13. The method as claimed in claim 11, further comprising at least one of:

displaying information contained in the diagnostic signal relating to damaged assemblies and their predicted remaining service life or a user; and transmitting said information by telemetry to a corresponding workshop or a machine plant operator.

14. The method as claimed in claim 11, further comprising:

implementing an emergency operating mode in response to the diagnostic signal for assemblies which are diagnosed as damaged, to prevent or reduce further damage to the assembly which is diagnosed as damaged, and to ensure further availability of the machine plant.

15. The method as claimed in claim 14, further comprising:

if a plurality of possibilities are available for an emergency operating mode, said plurality selection are displayed for a user, so that the user can select a most desired an emergency operating mode.

16. The method as claimed in claim 14, wherein, if the damaged machine plant is a drive train, a gear speed corresponding to damage to the gearbox is jumped over, or the engine power or engine speed is reduced, as an emergency operating mode.

17. The method as claimed in claim 14, wherein, if the machine system is a drive train, a retarder is switched off and a brake system assumes its function as an emergency operating mode if a defect is diagnosed in the retarder.

18. The method as claimed in claim 14, wherein, if the machine system is a drive train, the function of a brake is assumed by a retarder in the emergency operating mode if a defect is diagnosed in the brake as drive train component.

* * * * *